| United States Patent [19] | [11] Patent Number: 4,702,938 |
| Yasunaga et al. | [45] Date of Patent: Oct. 27, 1987 |

[54] PROCESS FOR PRODUCING MAGNETIC RECORDING MATERIAL

[75] Inventors: Tadashi Yasunaga; Akio Yanai; Ryuji Shirahata, all of Kanagawa, Japan

[73] Assignee: Fuji Photo Film Co., Ltd., Kanagawa, Japan

[21] Appl. No.: 933,446

[22] Filed: Nov. 21, 1986

[30] Foreign Application Priority Data

Nov. 21, 1985 [JP] Japan .............................. 60-262223

[51] Int. Cl.⁴ ............................................. H01F 10/02
[52] U.S. Cl. ................................. 427/132; 427/251; 427/296

[58] Field of Search ..................... 427/132, 251, 296

Primary Examiner—Bernard D. Pianalto
Attorney, Agent, or Firm—Sughrue, Mion, Zinn, Macpeak and Seas

[57] ABSTRACT

A process for fabricating magnetic tape in which a tape substrate in passed through a stream of evaporating material so as to present a continuously varying angle of incidence to the stream. The maximum and minimum angles of incidence are defined. Oxidizing gas is applied to the tape at the minimum angle of incidence and at an intermediate angle.

4 Claims, 3 Drawing Figures

PROCESS FOR PRODUCING MAGNETIC RECORDING MATERIAL

BACKGROUND OF THE INVENTION

1. Field of the Invention

The present invention relates to a process for producing a magnetic recording medium with a thin ferromagnetic film being vacuum-deposited on a moving substrate as a magnetic recording layer. More particularly, the present invention relates to a process for producing a magnetic recording medium having superior weatherproofness and improved electromagnetic conversion characteristics.

2. Background of the Invention

Commonly employed magnetic recording media are of the coated type and are manufactured as follows. Magnetic particles are used that are in the form of an oxide powder made of, for example, $\gamma$-$Fe_2O_3$, Co-doped $\gamma$-$Fe_2O_3$, $Fe_3O_4$, Co-doped $Fe_3O_4$, a Berthollide compound of $\gamma$-$Fe_2O_3$ and $Fe_3O_4$, Co-doped Berthollide compound, or $CrO_2$, or in the from of an alloy powder based on, for example, Fe, Co or Ni. These magnetic particles are dispersed in organic binders such as a vinyl chloride/vinylacetate copolymer, a styrene/-butadiene copolymer, an epoxy resin or a polyurethane resin. The resulting magnetic paint is applied to a nonmagnetic substrate and dried.

With the growing need for higher-density magnetic recording thin films of ferromagnetic metals formed by such methods as evaporation, sputtering and ion plating have attracted researchers' attention because of their utility in binder-free magnetic recording media of the "thin metal film type" and active efforts are being made to commercialize them.

The conventional magnetic recording media of the coated type are not adapted to recording for large output and at high density because the magnetic materials they chiefly use are formed of metal oxides having small saturation magnetization. Additionally the magnetic material accounts for only 30–50% of the volume of the magnetic layer. The coated-type media have the additional disadvantage that their manufacturing process is complicated and requires costly equipment for solvent recovery or pollution control. On the other hand, magnetic recording media of the thin metal film type have the advantage that ferromagnetic films having a larger saturation magnetization than oxide-based magnetic materials can be formed as extremely thin films without using any nonmagnetic materials such as organic binders. The practice of high-density recording has also increased the use of a playback head having a gap length of not more than 1.0 micrometer and this in turn has created the tendency that the depth of recording in the magnetic recording layer is reduced. Under these circumstances, magnetic recording media of the thin metal film type which permits the entire thickness of the magnetic film to be utilized in the recording of magnetic information are best suited for use in large-output and high-density recording. While thin metal-film type media can be manufactured by various methods, vacuum evaporation has the advantages that it achieves rapid film formation, requires a simple manufacturing scheme, and is a dry process which involves no need for effluent treatment. It has been proposed that a beam of evaporated magnetic metal be deposited at an angle on the surface of a nonmagnetic support and this method is highly advantageous for practical purposes since it requires comparatively simple manufacturing process and equipment and enables the production of films having good magnetic characteristics.

However, magnetic recording madia that employ thin films of ferromagnetic metals formed by evaporation have one major problem associated with weatherproofness. No magnetic recording medium that is being stored should experience any attenuation or loss of the recorded signal on account of corrosion or otherwise initiated time-dependent deterioration. In addition, 8-mm video tapes are in most cases used outdoor and the magnetic recording media of which they are formed must have satisfactory weather-proofness under the various environmental conditions in which they are used. Although the magnetic recording media that employ thin films of ferromagnetic metals formed by evaporation exhibit superior electromagnetic conversion characteristics over the conventional coated-type media, the recent improvement in the characteristics of the latter type has been remarkable and this calls for further improvements in the electromagnetic conversion characteristics of the evaporated-type media.

While various proposals have been made in order to improve the weatherproofness of magnetic recording media that employ thin deposited-vapor films of ferromagnetic metals as recording layers, one method is described in Japanese Patent Application (OPI) Nos. 198543/1982 and 17544/1983 (the term OPI as used hereinafter means an unexamined published Japanese patent application). According to this method, a thin film of ferromagnetic metal is vapor-deposited on a nonmagnetic substrate travelling on the periphery of the lateral side of a rotating cylinder. Thereafter, the surface of the thin film while being guided by the same cylinder is exposed to a glow discharging atmosphere made of an oxidizing gas. This method is effective to some extent in reducing the decrease in remanence that will occur during storage in a hot and humid atmosphere but the improvement achieved in this respect is not completely satisfactory. In addition, this method is ineffective for the purpose of providing improved electromagnetic conversion characteristics.

The supplying of oxygen simultaneously with vacumdeposition of ferromagnetic materials at an angle has been proposed in patent references such as Japanese Patent Application (OPI) Nos. 32234/1983, 37843/1983, 41439/1983, 41442/1983, 41443/1983, 53027/1983, 45625/1983 and 157717/1985. However, none of the methods proposed in these references have achieved satisfactory improvements in weatherproofness or electromagnetic conversion characteristics.

SUMMARY OF THE INVENTION

An object, therefore, of the present invention is to provide a process for producing an evaporation-formed magnetic recording medium having superior weatherproofness and good electromagnetic conversion characteristics.

The present invention relates to a process for producing a magnetic recording medium by allowing a vapor stream of magnetic metallic material from an evaporation source to be deposited at an angle on a moving substrate. A thin ferromagnetic film is formed with said substrate being moved in such a manner that the angle of incidence ($\theta$) of said vapor stream with respect to the moving substrate varies continuously from its maximum value ($\theta_{max}$) to a minimum value ($\theta_{min}$) while an oxidizing gas is both supplied to an area that is in the vicinity of the substrate and which is close to the vapor stream having the minimum angle of incidence ($\theta_{min}$) and as well as supplied to an area that is also in the vicinity of the substrate and which is close to the vapor stream having an intermediate angle of incidence ($\theta_i$).

In a preferable embodiment of the prsent invention, the intermediate angle of incidence ($\theta_i$) is set to a value that satisfies the following relation:

$(2\theta_{max}+3\theta_{min})/5 \leq \theta_i \leq \theta_{max}$

In a more preferable embodiment, the amount of oxidizing gas being supplied to the area which is close to the vapor stream having an intermediate angle of incidence ($\theta_i$) is equal to or greater than half the amount of oxidizing gas to be supplied to the area which is close to the vapor stream having the minimum angle of incidence ($\theta_{min}$).

DETAILED DESCRIPTION OF THE INVENTION

Figure 1:
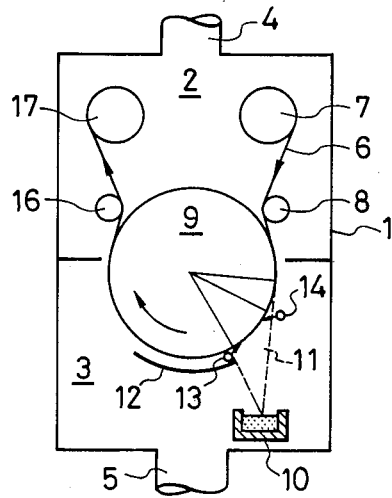
FIG. 1 is a schematic representation of the process of the present invention for producing a magnetic recording medium.

The process of the present invention for producing a magnetic recording medium is described hereinafter with reference to FIG. 1. A vacuum chamber 1 is divided into an upper compartment 2 and a lower compartment 3 which are evacuated through discharge ports 4 and 5, respectively. A substrate in a tape form 6 is unwound from a delivery roll 7 and, being guided by a guide roller 8, is transported on a cylindrical can 9. An evaporation source 10 is positioned below the can 9 and produces a vapor stream 11 of ferromagnetic material which forms a continuous thin magnetic film on the surface of the substrate 6 as it is transported on the can 9. A mask 12 is situated in such a manner that only those components of the vapor stream 11 which have a desired range of incident angles will reach the substrate. Gas inlet ports 13 and 14 are provided for supplying an oxidizing gas to selected areas of the vapor-deposited film. The substrate 6 on which the thin magnetic film has been formed departs from the can 9 and is guided by a guide roller 16 so that it is wound up by a takeup roll 17.

Figure 2:
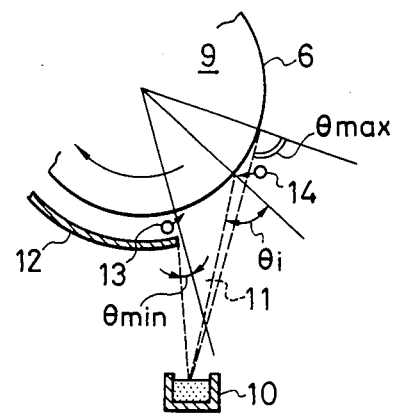
FIGS. 2 and 3 show the essential part of two embodiments of the process of the present invention for producing a magnetic recording medium.
Figure 3:
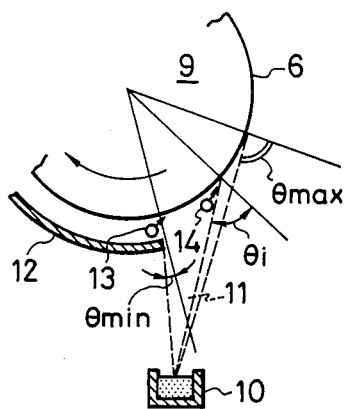

FIGS. 2 and 3 show the essential parts of two embodiments of the process of the present invention for producing a magnetic recording medium. As the substrate 6 travels on the surface of the can 9, the angle at which the vapor stream 11 from the evaporation source 10 strikes the substrate surface 6 changes continuously from its maximum value ($\theta_{max}$) to minimum value ($\theta_{min}$). In the present invention, the gas inlet port 13 is provided so as to supply an oxidizing gas to an area that is in the vicinity of the substrate 6 on the can 9 and which is close to the vapor stream having the minimum angle of incidence ($\theta_{min}$). At the same time, the gas inlet port 14 is provided so as to supply an oxidizing gas to an area that is also in the vicinity of the substrate 9 and which is close to the vapor stream having an intermediate angle of incidence ($\theta_i$).

In the present invention, the maximum angle of incidence ($\theta_{max}$) and the minimum angle of incidence ($\theta_{min}$) are preferably set to values within the ranges of 60°–90° and 25°–70°, respectively. The intermediate angle of incidenc ($\theta_i$) is preferably set to a value which satisfies the folowings relation:

$(2\theta_{max}3\theta_{min})/5 \leq \theta_i \leq \theta_{max}$

The magnetic metallic material used in the present invention is selected from among metals such as Fe, Co and Ni, and ferromagnetic alloys such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Fe-Cr, Co-Cr, Ni-Cr, Fe-Co-Cr, Ni-Co-Cr and Fe-Co-Ni-Cr.

The vapor-deposited film of magnetic metallic material must be thick enough to allow the magnetic recording medium to provide satisfactory output but, at the same time, the film must be thin enough to enable the desired high-density recording. In order to meet these two requirements, the magnetic film thickness typically ranges from about 0.02 to 5.0 micrometers, preferably from 0.05 to 2.0 micrometers.

The substrate used in the present invention is preferably a plastic base made of, for example, polyethylene terephthalate, polyimide, polyamide, polyvinyl chloride, triacetyl cellulose, polycarbonate, or polyethylene terephthalate.

A preferable oxidizing gas is oxygen which may be used either alone or in mixture with other gases. The amount of supplied oxidizing gas cannot be limited to any definite value since it varies with the capacity of the vacuum chamber, the evacuation rate, the layout of the components in the vacuum chamber, the rate of evaporation of the magnetic material, deposition rate, the speed at which the substrate travels, the thickness of the substrate, and the type of magnetic material used. If a film having a thickness of 0.1–0.2 micrometers is to be formed from a Co-based magnetic material, the amount of oxidizing gas supplied per unit area of the substrate is preferably within the range of 40–800 ml/m$^2$. The amount of oxidizing gas supplied per unit area of the substrate is expressed by D/vw where D is the amount of oxidizing gas suplied in the transverse direction of the substrate, v is the transport speed of the substrate, and w is the thickness of the thin magnetic film deposited on the substrate. It is more desirable for the purposes of the present invention that the amount of oxidizing gas supplied to an area which is close to the vapor stream having an intermediate angle of incidence ($\theta_i$) is equal to or greater than half the amount of oxidizing gas supplied to an area which is close to the vapor stream having the minimum angle of incidence ($\theta_{min}$).

The term "deposition" used in this specification includes not only ordinary vacuum deposition techniques as described in U.S. Pat. No. 3,342,632 and other patent references but also methods of forming thin films on supports in an atmosphere wherein the mean free path of molecules in a vapor stream is increased by ionizing or accelerating it using electric-field, magnetic-field or electron-beam energy. Therefore, an electric-field assisted vapor deposition technique of the type described in Japanese Patent Application (OPI) No. 149008/1976, as well as ionization-assisted vapor deposition techniques of the types described in Japanese Patent Publication Nos. 11525/1968, 20484/1971, 26579/1972 and 45439/1974, and Japanese Patent Application (OPI) Nos. 33890/1974, 34483/1974 and 535/1974 may also be employed in the present invention.

The thin magnetic film in the magnetic recording medium produced by the present invention may be dual-layered. If desired, adjacent magnetic layers may be interposed by a nonmagnetic layer made of, for example, Cr, Si, Al, Mn, Bi, Ti, Sn, Pb, In, Zn, or Cu, or oxides or nitrides thereof. The nonmagnetic layer may be disposed as a primer coating between the magnetic layer and the substrate. A protective layer which is either organic or inorganic may be formed on the magnetic layer. A back layer may be formed on the side of the substrate which is opposite the side where the magnetic layer is formed.

The following examples are provided for the purpose of further illustrating the advantages of the present invention but are in no way to be taken as limiting.

EXAMPLE 1

A vacuum deposition apparatus was used that employed a takeup roll and the essential parts of which are shown in FIG. 2. Web samples of magnetic tape were prepared by forming a thin Co-Ni magnetic film (25 wt % Ni) on polyethylene terephthalate films 9.5 micrometers thick, with the vapor stream being deposited at an angle with respect to the support films. The process conditions employed were as follows: support width, 100 mm; transport speed, 50 m/min; $\theta_{max}$, 90°; $\theta_{min}$, 30°; and magnetic film thickness, 0.15 micrometers. An oxygen gas was supplied in an amount of 800 ml/min (1 kg/cm$^2$) onto the vicinity of an area where the vapor stream struck the support at the minimum angle of incidence ($\theta_{min}$). The intermediate angle of incidence ($\theta_i$) was set to 70° and the web samples were prepared with varying amounts of oxygen gas being supplied to the area where the vapor stream had this value of intermediate incident angle. The amount of oxygen gas supplied to the vicinity of the area where the vapor stream had the minimum angle of incidence ($\theta_{min}$) was equivalent to 160 ml/m$^2$.

Each of the so prepared magnetic tape webs was slit to a width of 8 mm and loaded into an 8-mm video cassette. The S/N ratio of the luminance signal obtained from each of the tape samples was measured with an 8-mm VTR (FujiX-8m6 of Fuji Photo Film Co., Ltd.). The video cassette was exposed to 60° C. and 90% relative humidity for one month and the tape surface was examined with a microscope to see whether any corrosion had developed. The results are shown in Table 1.

TABLE 1

| Sample No. | O$_2$ gas supplied to the area of $\theta_i$ (ml/m$^2$) | S/N of luminance signal (dB) | Corrosion |
|---|---|---|---|
| 1 | 40 | −5 | X |
| 2 | 60 | −4 | X |
| 3 | 80 | 0 | O |
| 4 | 120 | 2 | O |
| 5 | 160 | 4 | O |
| 6 | 200 | 4 | O |
| 7 | 250 | 5 | O |

Notes:
"O" indicates no corrosion detected under a microscope (x 100); "#", no corrosion detected by visual inspection; "X", corrosion detected by visual inspection.

EXAMPLE 2

Using a vacuum deposition apparatus that employed a takeup roll and the essential parts of which are shown in Table 2, web samples of magnetic tape were prepared by forming a thin Co magnetic film on polyethylene terephthalate films of 12.5 micrometers thickness, with the vapor stream being deposited at an angle with respect to the support films. The process conditions employed were as follows: support width, 500 mm; transport speed, 60 m/min; $\theta_{max}$, 90°; $\theta_{min}$, 40°; and magnetic film thickness, 0.18 micrometers. An oxygen gas was supplied in an amount of 2,000 ml/min (1 kg/cm$^2$) onto the vicinity of an area where the vapor stream struck the support at the minimum angle of incidence ($\theta_{min}$), and in an amount of 2,000 ml/min (1 kg/cm$^2$) onto the area where the vapor stream was allowed to strike the support at varying values of intermediate incident angle ($\theta_i$).

As in Example 1, each of the web samples was slit to a width of 8 mm, loaded into an 8-mm video cassette, and examined for the S/N ratio of luminance signal and development of any corrosion after storage. The result are shown in Table 2.

TABLE 2

| Sample No. | Intermediate angle of incidence ($\theta_i$) | S/N of luminance signal (dB) | Corrosion |
|---|---|---|---|
| 8 | 40° | −4 | X |
| 9 | 50° | −4 | X |
| 10 | 60° | 0 | # |
| 11 | 70° | 3 | O |
| 12 | 80° | 4 | O |
| 13 | 90° | 3 | O |

Note:
Sample No. 8 was prepared with oxygen gas being supplied in an amount of 4,000 (2,000 + 2,000) ml/min onto the area where the vapor stream struck at the minimum angle of incidence ($\theta_{min}$).

EXAMPLE 3

Using a vacuum deposition apparatus that employed a takeup roll and the essential parts of which are shown in FIG. 3, web samples of magnetic tape were prepared by forming a thin Co-Ni magnetic film (5 wt % Ni) on polyethylene therephthalate films of 12.5 micrometers thickness, with the vapor stream being deposited at an angle with respect to the support films. The process conditions employed were as follows: support width, 100 mm; transport speed, 40 m/min; $\theta_{max}$, 90°; $\theta_{min}$, 45°; and magnetic film thickness, 0.20 micrometers. An oxygen gas was supplied in an amount of 500 ml/min (1 kg/cm$^2$) onto the vicinity of an area where the vapor stream struck the support at the minimum angle of incidence ($\theta_{min}$), and in an amount of 750 ml/min (1 kg/cm$^2$) onto the area where the vapor stream was allowed to strike the support at varying values of intermediate incident angle ($\theta_i$) as in Example 2.

As in Example 1, each of the web samples was slit to a width 8 mm, loaded into an 8-mm video cassette, and examined for the S/N ratio of luminance signal and development of any corrosion after storage. The results are shown in Table 3.

TABLE 3

| Sample No. | Intermediate angle of Incidence ($\theta_i$) | S/N of luminance signal (dB) | Corrosion |
|---|---|---|---|
| 14 | 45° | −3 | X |
| 15 | 55° | −4 | X |
| 16 | 65° | 2 | O |
| 17 | 75° | 4 | O |
| 18 | 85° | 4 | O |

TABLE 3-continued

| Sample No. | Intermediate angle of Incidence ($\theta_i$) | S/N of luminance signal (dB) | Corrosion |
|---|---|---|---|
| 19 | 90° | 3 | O |

Note:
Sample No. 14 was prepared with oxygen gas being supplied in an amount of 1,250 (500 + 750) ml/min onto the area where the vapor stream struck at the minimum angle of incidence ($\Theta_{min}$).

As is clear from Examples 1 to 3, a magnetic recording medium of the thin metalic film type having superior weatherproofness and improved electromagnetic conversion characteristics can be produced by allowing a vapor stream to be deposited at an angle in such a manner that the angle of incidence of the vapor stream varies continuously from its maximum value ($\theta_{max}$) to minimum value ($\theta_{min}$) and by supplying an oxygen gas both to the vicinity of an area where the vapor stream has the minimum angle of incidence ($\theta_{min}$) and to the vicinity of an area where the vapor stream has an intermediate angle of incidence ($\theta_i$). It is also clear from Examples 2 and 3 that the intermediate angle of incidence ($\theta_i$) is preferably not greater than $\theta_{max}$ and not smaller than $(2\theta_{max}+3\theta_{min})/5$ (which is 60° in Example 2 and 63° in Example 3). Example 1 shows that the amount of oxygen gas to be supplied to the vicinity of an area where the vapor stream being deposited has the intermediate angle of incidence ($\theta_i$) is equal to or greater than half the amount of oxygen gas to be supplied to the vicinity of an area where the vapor stream has the minimum angle of incidence ($\theta_{min}$).

In short, the process of the present invention enables the production of a magnetic recording medium that has superior electromagnetic conversion characteristics and improved waterproofness and which hence exhibits very good performance in practical applications.

What is claimed is:

1. A process for producing a magnetic recording medium, comprising the steps of:
    evaporating a magnetic metallic material from an evaporation source into an evporation stream;
    moving a substrate onto which said evaporating magnetic material is deposited through said evaporation stream such that an angle of incidence of said evaporation stream on said substrate varies from a maximum value ($\theta_{max}$) to a minimum value ($\theta_{min}$); and
    supplying an oxidizing gas both to a vicinity of said substrate near said minimum angle of incidence and to a vicinity having an intermediate angle of incidence ($\theta_i$) between said minimum and maximum angles of incidence.

2. A process according to claim 1 wherein said intermediate angle of incidence ($\theta_i$) is set to a value that satisfies the following relation:

$$(2\theta_{max}+3\theta_{min})/5 \leq \theta_i \leq \theta_{max}.$$

3. A process according to claim 2, wherein the amount of oxidizing gas being supplied to said vicinity having said intermediate angle of incidence ($\theta_i$) is equal to or greater than half the amount of oxidizing gas to being supplied to said vicinity near said minimum angle of incidence ($\theta_{min}$).

4. A process according to claim 3, wherein said substrate is moved from said maximum angle of incidence to said minimum angle of incidence.

* * * * *